United States Patent [19]

Kaeding et al.

[11] 3,906,054
[45] Sept. 16, 1975

[54] ALKYLATION OF OLEFINS

[75] Inventors: Warren W. Kaeding, Westfield; Stephen A. Butter, East Windsor, both of N.J.

[73] Assignee: Mobil Oil Corporation, New York, N.Y.

[22] Filed: Sept. 23, 1974

[21] Appl. No.: 508,306

[52] U.S. Cl. ........ 260/683.43; 260/666 A; 260/682
[51] Int. Cl.² ........................................... C07C 3/52
[58] Field of Search............ 260/683.43, 682, 666 A

[56] References Cited
UNITED STATES PATENTS
3,763,260  10/1973  Pollitzer...................... 260/683.43

*Primary Examiner*—Delbert E. Gantz
*Assistant Examiner*—G. J. Crasanakis
*Attorney, Agent, or Firm*—Charles A. Huggett; Vincent J. Frilette

[57] ABSTRACT

This specification discloses a process for the alkylation of olefins. The olefins are alkylated by contacting in the presence of an alkylating agent with a catalyst. The catalyst comprises a crystalline aluminosilicate zeolite having a silica to alumina ratio of at least about 12, a constraint index of about 1 to 12, and containing phosphorus incorporated with the crystal structure thereof in an amount of at least about 0.78 percent by weight. The zeolite, preferably, also has a dried crystal density of not less than about 1.6 grams per cubic centimeter. Olefins that may be alkylated include ethylene, propylene, butene-2 and isobutylene. Alkylating agents include methanol, dimethyl ether, and methyl chloride.

35 Claims, No Drawings

ALKYLATION OF OLEFINS

BACKGROUND OF THE INVENTION

1. Field of the Invention

This invention relates to the alkylation of olefins.

2. Description of the Prior Art

U.S. Pat. No. 3,702,886, issued Nov. 14, 1972, to Argauer et al., discloses ZSM-5 catalyst.

U.S. Pat. No. 3,709,979, issued Jan. 9, 1971, to Chu, discloses ZSM-11 zeolite catalyst.

West German Offenlagunschrifft 2,213,109, published Sept. 21, 1972, to Mobil Oil Corporation, discloses ZSM-12 catalyst.

Copending application Ser. No. 358,192, filed May 7, 1973, discloses ZSM-21 zeolite catalyst.

Copending application Ser. No. 130,442, filed Apr. 11, 1971, discloses TEA mordenite.

Copending application Ser. No. 508,308, filed Sept. 23, 1974, discloses a catalyst comprising a crystalline aluminosilicate zeolite having a silica to alumina ratio of at least about 12, a constraint index of about 1 to 12, and containing phosphorus incorporated with the crystal structure thereof in an amount of at least about 0.78 percent by weight and the conversion of aliphatic compounds, particularly hydrocarbons, both paraffins and olefins, by contact with the catalyst.

Copending application Ser. No. 508,307, filed Sept. 23, 1974, discloses the conversion of methanol and dimethyl ether to obtain a reaction product containing olefins employing as a catalyst a crystalline aluminosilicate zeolite having a silica to alumina ratio of at least about 12, a constraint index of about 1 to 12, and containing phosphorus incorporated with the crystal structure thereof in an amount of at least about 0.78 percent by weight.

SUMMARY OF THE INVENTION

In accordance with the invention, an olefin is alkylated with an alkylating agent by a process wherein the olefin is contacted in the presence of the alkylating agent with a catalyst comprising a crystalline aluminosilicate zeolite having a silica to alumina ratio of at least about 12, a constraint index of about 1 to 12, and containing phosphorus incorporated with the crystal structure thereof in an amount of at least about 0.78 percent by weight.

DESCRIPTION OF THE PREFERRED EMBODIMENTS

The alkylation of the olefin is carried out by contacting the olefin in the presence of the alkylating agent with the catalyst. This can be effected, for example, by mixing the olefin with the alkylating agent and contacting the mixture with the catalyst. The catalyst may be in the form of a fixed bed or a movable bed when contacted with the mixture of olefin and alkylating agent.

Any olefin may be alkylated by the process of the invention. Desirably, the olefin is a lower olefin. Preferably, the lower olefin contains 2 to 4 carbon atoms. Lower olefins that may be alkylated include ethylene, propylene, butene-1, butene-2, and isobutene.

For alkylation of the olefin by the process of the invention, any suitable alkylating agent may be employed. These alkylating agents contain an alkyl group capable of forming a bond between a carbon atom from the alkylating agent and a carbon atom of the olefin undergoing alkylation. Preferably, the alkylating agent contains a methyl group. Alkylating agents which may be employed include methanol, dimethyl ether, and methyl chloride.

Alkylation of the olefin with the alkylating agent by the process of the invention results in addition to the olefin of the alkyl group, or one of the alkyl groups where the alkylating agent contains more than one alkyl group. The alkylation product, therefore, is an olefin having a number of carbon atoms equal to the number of the carbon atoms in the olefin being alkylated plus the number of carbon atoms in an alkyl group of the alkylating agent. The alkyl group of the alkylating agent replaces one of the hydrogen atoms attached to the double bond of the olefin, with a preference for the end carbon atom where the double bond is on an end carbon atom. Other reaction products are also formed as a result of side reactions including interaction of the alkylating agent with itself or the alkylation product.

Alkylation of the olefin with the alkylating agent by the process of the invention requires an elevated temperature. Preferably, this temperature is at least 250° C. However, higher temperatures such as temperatures of at least about 300° C and up to about 400° C and higher may also be employed. With the higher temperatures, a greater degree of conversion of the reactants is attained. By "degree of conversion", we mean the amounts of the olefin and alkylating agent that are converted to other products. However, the selectivity to the desired product of alkylation is not necessarily increased by increased temperature of the alkylation. By "selectivity", we mean the proportion of any reaction product in the total reaction product. The optimum temperature from the standpoint of either degree of conversion or selectivity will differ for each combination of olefin and alkylating agent, all other conditions being equal. Further, the minimum temperature to effect alkylation, all other conditions being equal, will also depend upon the combination of olefin and alkylating agent. For example, with propylene as the olefin and methyl chloride as the alkylating agent, a temperature of at least about 350° C is required for reaction.

The alkylation reaction may be carried out with the olefin or the alkylating agent, or both, in the liquid phase or in the vapor phase. Where the olefin or the alkylating agent is in the vapor phase at the temperature at which the reaction is to be carried out, superatmospheric pressure must be employed to effect liquid phase operation. In order to avoid the difficulties of carrying out the reaction under superatmospheric pressure, therefore, the reaction is preferably carried out in the vapor phase.

Preferably, also, fixed bed operation is employed. In this type of operation, the mixture of olefin and alkylating agent can be passed over the fixed bed of the catalyst at a rate of about 0.5 to 1 unit weight of reactants per hour per unit weight of catalyst, i.e., at a weight per hour space velocity (WHSV) of about 0.5 to 1. Lower weight per hour space velocities may, of course, be employed. Higher weight per hour space velocities may also be employed. Thus, a weight per hour space velocity of about 19 or higher may be employed. With a greater weight per hour space velocity, other conditions being equal, a greater selectivity to the desired alkylation product is obtained.

The ratio of olefin to alkylating agent contacted with each other in the presence of the catalyst is preferably approximately equimolar. An excess of either the olefin or the alkylating agent may also be employed. However, both the olefin and alkylating agent are capable of conversion by the catalyst at the alkylating temperatures employed. Accordingly, any excess of the olefin or alkylating agent will react to form unwanted reaction products and represents a waste of reactant.

The essence of the invention is the use of the catalyst comprising the crystalline aluminosilicate zeolite having a silica to alumina ratio of at least about 12, a constraint index of about 1 to 12, and containing phosphorus incorporated with the crystal structure thereof in an amount of at least about 0.78 percent by weight. This catalyst employed in the present invention is disclosed in copending application Ser. No. 508,308, filed Sept. 23, 1974, and the entire disclosure of the copending application is incorporated herein by reference.

A group of crystalline aluminosilicate zeolites having a silica to alumina ratio of at least about 12 and a constraint index of about 1 to 12 has recently been discovered to have some very unusual catalytic properties. They induce profound transformations of aliphatic hydrocarbons to aromatic hydrocarbons in commercially desirable yields. Further, although they have unusually low alumina contents, i.e., high silica to alumina ratios, they are active even when the silica to alumina ratio exceeds 30. This activity is considered to be surprising since the alumina in the zeolite framework is believed responsible for catalytic activity. They retain their crystallinity for long periods in spite of the presence of steam at high temperature which induces irreversible collapse of the framework of other zeolites, e.g., of the X and A type. Furthermore, carbonaceous deposits, when formed, may be removed by burning at higher than usual temperatures to restore activity.

An important characteristic of the crystal structure of these zeolites is that it provides constrained access to, and egress from, the intracrystalline free space by virtue of having a pore dimension greater than about 5 Angstroms and pore windows of about a size as would be provided by ten-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the center of the tetrahedra. Briefly, the zeolites useful for preparing the phosphorus-containing zeolite employed as catalyst in this invention, hereinafter termed "the phosphorus-containing zeolite", possess, in combination, a silica to alumina ratio of at least about 12 and a structure providing constrained access to the crystalline free space defined in terms of a constraint index of about 1 to 12. Further reference will be made hereinafter to the constraint index.

The silica to alumina ratio referred to may be determined by conventional analysis. This ratio is meant to represent, as closely as possible, the ratio in the rigid anionic framework of the zeolite crystal and to exclude aluminum in the binder or in cationic form within the channels. Although zeolites with a silica to alumina ratio of at least about 12 are useful to prepare the phosphorus-containing zeolite employed as catalyst in this invention, it is preferred to use zeolites having higher ratios of at least about 30. Such zeolites, after activation, acquire an intracrystalline sorption capacity for normal hexane which is greater than that for water, i.e., they exhibit "hydrophobic" properties. It is believed that this hydrophobic character is advantageous.

The zeolites useful for preparation of the phosphorus-containing zeolite employed as catalyst in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by eight-membered rings of oxygen atoms, then access to molecules of larger cross-section than normal hexane is excluded and the zeolite is not of the desired type. Windows of ten-membered rings are preferred, although excessive puckering or pore blockage may render these zeolites ineffective. Twelve-membered rings do not generally appear to offer sufficient constraint, although structures can be conceived, due to pore blockage or other cause, that may be operative.

Rather than attempt to judge from crystal structure whether or not a zeolite possesses the necessary constrained access, a simple determination of the "constraint index" may be made by passing continuously a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F for at least 15 minutes. The zeolite is then flushed with helium and the temperature adjusted between 550° F and 950° F to give an overall conversion between 10 percent and 60 percent. The mixture of hydrocarbons is passed at 1 liquid hourly space velocity (i.e., 1 volume of hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Zeolites suitable for use are those having a constraint index, as mentioned, from about 1 to 12. Preferably, the constraint index is from about 2 to 7.

The zeolites defined herein are exemplified, to the extent that they have a silica to alumina ratio of at least about 12 and a constraint index of about 1 to 12, by ZSM-5, ZSM-11, ZSM-12, ZSM-21, TEA mordenite and other similar materials.

The entire contents of recently issued U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in West German Offenlagunschrifft 2,213,109, the entire contents of which are incorporated herein by reference.

ZSM-21 is more particularly described in U.S. application Ser. No. 358,192, filed May 7, 1973, the entire contents of which are incorporated herein by reference.

TEA mordenite is more particularly described in U.S. application Ser. No. 130,442, filed Apr. 11, 1971, the entire contents of which are incorporated herein by reference.

The zeolites, when prepared in the presence of organic cations, are catalytically inactive, possibly because the intracrystalline free space is occupied by organic cations from the forming solution. They may be activated by heating in an inert atmosphere at 500° C for one hour, for example, followed by base exchange with ammonium salts followed by calcination at 500° C in air. The presence of organic cations in the forming solution may not be absolutely essential to the formation of the zeolite; however, the presence of these cations does appear to favor the formation of these special zeolites. More generally, it is desirable to activate the zeolite catalyst by base exchange with ammonium salts followed by calcination in air at about 500° C for from about 15 minutes to about 24 hours.

Natural zeolites may sometimes be converted to zeolites suitable for preparing the catalysts for use in the present invention by various activation procedures and other treatments such as base exchange, steaming, alumina extraction and calcination, in combinations. Natural minerals which may be so treated include ferrierite, brewsterite, stilbite, dachiardite, epistilbite, heulandite, and clinoptilolite. The preferred zeolites are ZSM-5, ZSM-11, ZSM-12, ZSM-21, and TEA mordenite, with ZSM-5 particularly preferred.

In a preferred aspect, the zeolites for preparation of the phosphorus-containing zeolite employed as catalyst in this invention are those having a crystal density, in the dry hydrogen form, of not substantially below about 1.6 grams per cubic centimeter. It has been found that zeolites which satisfy all three of these criteria are most desired. Therefore, the preferred phosphorus-containing zeolites are prepared from zeolites having a constraint index as defined above of about 1 to 12, a silica to alumina ratio of at least about 12, and a dried crystal density of not less than about 1.6 grams per cubic centimeter. The dry density for known structures may be calculated from the number of silicon plus aluminum atoms per 1000 cubic Angstroms, as given, e.g. on page 11 of the article on Zeolite Structure by W. M. Meier. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. This density of not substantially below about 1.6 grams per cubic centimeter of course must be associated with a relatively small amount of free space within the crystal, which might be expected to result in more stable structures. This free space, however, is important as the locus of catalytic activity.

The zeolites whether having phosphorus incorporated therewith or not are capable of having at least a portion of the original cations associated therewith replaced by a wide variety of other cations according to techniques well known in the art. Replacing cations include ammonium and metal cations, including mixtures of the same. The phosphorus-containing zeolite employed as catalyst in this invention is prepared from zeolites wherein at least a portion of the original cations associated therewith have been replaced by hydrogen.

The crystalline aluminosilicate zeolites can be converted to the hydrogen form, i.e., having at least a portion of the original cations associated therewith replaced by hydrogen, generally by two methods. The first involves direct ion exchange employing an acid. Suitable acids include both inorganic acids and organic acids. Typical inorganic acids which can be employed include hydrochloric acid, hypochlorous acid, sulfuric acid, sulfurous acid, hydrosulfuric acid, nitric acid, nitrous acid, hyponitrous acid, phosphoric acid, and carbonic acid. Typical organic acids which can be employed are the monocarboxylic and polycarboxylic acids which can be aliphatic, aromatic, or cycloaliphatic in nature. Representative suitable acids include acetic, trichloroacetic, bromoacetic, citric, maleic, fumaric, itaconic, phenylacetic, benzene sulfonic and methane sulfonic acids. The second method for preparing the hydrogen form, which is preferred, involves first preparing an ammonium or other hydrogen ion precursor form by base exchange and then calcining to cause evolution of the ammonia leaving a hydrogen ion remaining on the zeolite. Calcining is carried out in air at 500° C for about 15 minutes to about 24 hours. Suitable compounds for preparing the hydrogen ion precursor form include ammonium compounds such as chloride, bromide, iodide, bicarbonate, sulfate, citrate, borate, and palmitate. Still other ammonium compounds which can be employed include quaternary ammonium compounds such as tetramethylammonium hydroxide and trimethylammonium chloride.

The phosphorus-containing zeolite employed in the process of the present invention is prepared by reacting a zeolite as defined herein with a phosphorus-containing compound. This may be phosphorus per se or a compound thereof having a covalent or ionic constituent capable of reacting or exchanging with hydrogen ion and thereafter heating.

Any phosphorus-containing compound having a covalent or ionic constituent capable of reacting with hydrogen ion may be employed. Suitable phosphorus-containing compounds include derivatives of groups represented by $PX_3$, $RPX_2$, $R_2PX$, $R_3P$, $R_3P=O$, $RPO_2$, $RP(O)(OX)_2$, $R_2P(O)OX$, $RP(OX)_2$, $ROP(OX)_2$, and $(RO)_2POP(OR)_2$, where R is an alkyl or phenyl radical and X is hydrogen, R, or halide. These compounds include primary, $RPH_2$, secondary, $R_2PH$, and tertiary, $R_3P$, phosphines such as butyl phosphine; the tertiary phosphine oxides, $R_3PO$, such as tributylphosphine oxide; the primary, $RP(O)(OX)_2$, and secondary, $R_2P(O)OX$, phosphonic acids such as benzene phosphonic acid; the esters of the phosphonic acids such as diethyl phosphonate, $(RO)_2P(O)H$, dialkyl alkyl phosphonates, $(RO)_2P(O)R$, and alkyl dialkylphosphinates, $(RO)P(O)R_2$; phosphinous acids, $R_2POX$, such as diethylphosphinous acid, primary, $(RO)P(OX)_2$, secondary, $(RO)_2POX$, and tertiary, $(RO)_3P$, phosphites; and esters thereof such as the monopropyl ester, alkyl dialkylphosphinites, (RO)PR₂, and dialkyl alkylphosphonite, (RO)₂PR esters. Examples of phosphite esters include trimethylphosphite, triethylphosphite, diisopropylphosphite, butylphosphite; and pyrophosphites such as tetraethylpyrophosphite. The alkyl groups in the mentioned compounds contain one to four carbon atoms.

Other suitable phosphorus-containing compounds include the phosphorus halides such as phosphorus trichloride, bromide, and iodide, alkyl phosphorodichloridites, (RO)PCl₂, dialkyl phosphorochloridites, (RO)₂PX, dialkylphosphinochloridites, R₂PCl, alkyl alkylphosphonochloridates, (RO)(R)P(O)Cl, and dialkyl phosphinochloridates, R₂P(O)Cl.

Preferred phosphorus-containing compounds include trimethylphosphite and phosphorus trichloride. In the trimethylphosphite, the covalent ionic constituent capable of reacting with hydrogen ion is [CH₃—O—]⁻. In the phosphorus trichloride, the covalent or ionic constituent capable of reacting with hydrogen ion is [—Cl]⁻.

While we do not wish to be limited by the consequences of a theory, it is believed that the constituent of the phosphorus-containing compound capable of reacting with hydrogen ion reacts with the hydrogen of the original zeolite. Thus, with trimethylphosphite, it is believed that the hydrogen on the zeolite reacts with one of the [CH₃—O—] ions of the trimethylphosphite to form CH₃OH and is believed thereby to chemically bond the remainder of the trimethylphosphite molecule, namely, the

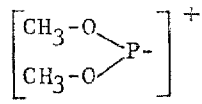

to the crystal structure of the zeolite possibly through a silanol group. In a similar manner, a phosphonate may undergo prototropic change in the manner

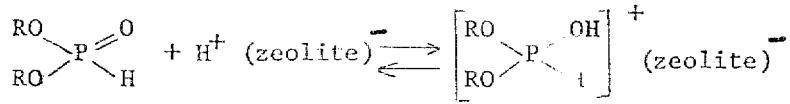

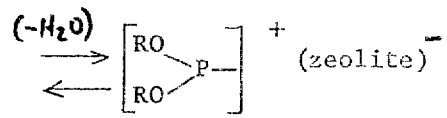

With phosphorus trichloride, it is believed that the hydrogen on the zeolite reacts with one of the [—Cl] ions of the phosphorus trichloride to form HCl and is believed thereby to chemically bond the remainder of the phosphorus trichloride molecule, namely, the [—PCl₂]⁺, to the crystal structure of the zeolite possibly through a silanol group. These phosphorus-containing moieties, after the heating, in the presence of free oxygen, could be present as [PO₂]⁺ or various phosphorus anhydride or hydroxyl forms. In any case, it is believed that the phosphorus is chemically bonded to the crystal structure of the zeolite since the phosphorus-containing zeolite can be used for extended periods of time at high temperatures without loss of phosphorus. Further reference will be made to this hereinafter. Further, the phosphorus is not likely present as a crystalline framework constituent, i.e., it has not been substituted for silicon or aluminum atoms, since the unit cell dimensions of the zeolite are unchanged on incorporation of phosphorus atoms with the zeolite. Further reference to this point will also be made hereinafter.

Incorporation of the phosphorus with the zeolite provides a composition having unique properties as a catalytic agent. For example, while the zeolites as defined herein are excellent aromatization catalysts, the phosphorus-containing zeolite does not possess such aromatizing activity. The ability of the zeolite to catalyze the transformation of aliphatic hydrocarbons to aromatic hydrocarbons in commercially desirable yields is not present with the phosphorus-containing zeolite. The zeolites possess strong acid sites and, while again we do not wish to be limited to the consequences of a theory, it is believed that the strong acid sites of the zeolites are responsible for their aromatizing activity. On the other hand, the phosphorus-containing zeolite does not possess these strong acid sites. Rather, the phosphorus-containing zeolite possesses a greater number of acid sites than the parent zeolite but these sites appear to have a lesser acid strength than those found in the parent zeolite. It is believed that the apparent replacement of the strong acid sites with a greater number of relatively weak acid sites may be responsible for the unique catalytic properties of the phosphorus-containing zeolite.

Reaction of the zeolite with the phosphorus-containing compound is effected by contacting the zeolite with the phosphorus-containing compound. Where the phosphorus-containing compound is a liquid, the phosphorus-containing compound can be in solution in a solvent at the time contact with the zeolite is effected. Any solvent relatively inert with respect to the phosphorus-containing compound and the zeolite may be employed. Suitable solvents include aliphatic, aromatic or alcoholic liquids. Where the phosphorus-containing compound is trimethylphosphite or liquid phosphorus trichloride, a hydrocarbon solvent such as n-octane may be employed. The phosphorus-containing compound may be used without a solvent, i.e., may be used as a neat liquid. Where the phosphorus-containing compound is in the gaseous phase, such as where gaseous phosphorus trichloride is employed, the phosphorus-containing compound can be used by itself or can be used in admixture with a gaseous diluent relatively inert to the phosphorus-containing compound and the zeolite such as air or nitrogen.

Preferably, prior to reacting the zeolite with the phosphorus-containing compound, the zeolite is dried. Drying can be effected in the presence of air. Elevated temperatures may be employed. However, the temperature should not be such, as mentioned hereinafter, that the crystal structure of the zeolite is destroyed.

Heating of the phosphorus-containing catalyst subsequent to preparation and prior to use is also preferred. The heating can be carried out in the presence of oxygen, for example air. Heating can be at a temperature of about 150° C. However, higher temperatures, i.e., up to about 500° C, are preferred. Heating can be carried out for 3–5 hours. It has been found that heating increases catalyst efficiency of the phosphorus-containing zeolite probably due to an increase in the number of acid sites rather than an increase in the strength of the existing acid sites. Increasing the heating temperature increases the catalyst efficiency. However, while heating temperatures above about 500° C can be employed, they are not necessary. At temperatures of about 1000° C, the crystal structure of the zeolite is destroyed.

The amount of phosphorus incorporated with the crystal structure of the phosphorus-containing zeolite should be at least about 0.78 percent by weight. With this amount of phosphorus, replacement of a sufficient proportion of the strong acid sites of the zeolite with an increased number of weak acid sites is effected. However, it is preferred in order to increase the replacement of the strong acid sites with an increased number of these weaker acid sites that the amount of phosphorus in the phosphorus-containing catalyst be at least about 2.5 percent by weight. The amount of phosphorus can be as high as about 4.5 percent by weight. The amount of phosphorus may be even higher than about 4.5 percent by weight although with these higher amounts a decline in catalytic activity can occur. By "percent by weight" we mean the unit weight of phosphorus per 100 unit weights of the zeolite. Amounts of phosphorus from about 0.78 to 4.5 percent by weight correspond to about 0.25 to 1.45 milliequivalents of phosphorus per gram of zeolite.

It was mentioned previously that the phosphorus is not likely present as a crystalline framework constituent of the phosphorus-containing zeolite. Evidence for this has been obtained by X-ray diffraction analysis of the zeolite before and after it has been modified by incorporation of phosphorus with the crystal structure to form the phosphorus-containing zeolite. The interplanar spacings are substantially identical for the zeolite before and after phosphorus incorporation. On the other hand, the relative intensities of the 11.10 and 0.95 A. d-spacings of the phosphorus-containing zeolite are phosphorus dependent, the relative intensities decreasing with phosphorus concentration in the phosphorus-containing zeolite. The relative intensities of the remaining d-spacings are unaffected by the presence of the phosphorus in the phosphorus-containing zeolite. Characterization of the phosphorus-containing zeolite with respect to the zeolite can, in fact, be made on the basis of the decrease in the 11.10 and the 9.95 A. d-spacings as a result of the incorporation of the phosphorus with the zeolite.

The amount of phosphorus incorporated with the zeolite by reaction with the phosphorus-containing compound will depend upon several factors. One of these is the reaction time, i.e., the time that the zeolite and the phosphorus-containing compound are maintained in contact with each other. With greater reaction times, all other factors being equal, a greater amount of phosphorus is incorporated with the zeolite. Another factor is the ratio of the phosphorus-containing compound to the zeolite in the reaction mixture employed to effect incorporation of the phosphorus with the zeolite. With greater ratios of phosphorus-containing compound to zeolite, again all other factors being equal, a greater amount of phosphorus is incorporated with the zeolite. Other factors upon which the amount of phosphorus incorporated with the zeolite is dependent include reaction temperature, concentration of the phosphorus-containing compound in the reaction mixture, the degree to which the zeolite has been dried prior to reaction with the phosphorus-containing compound and the conditions of drying of the phosphorus-containing zeolite after reaction of the zeolite with the phosphorus-containing compound.

It has been found that the concentration of phosphorus-induced weak acid sites, and thus the catalytic activity, of the phosphorus-containing zeolite is altered upon contact with water vapor. Thus, upon contact with water vapor the number of weak acid sites appears to be increased. This increase may occur after the phosphorus-containing zeolite is put into use as a catalyst as a result of contact with water vapor contained in the feed to the catalyst or formed during the reaction of the feed with the catalyst. Preferably, however, in order to obtain the benefits of an initial increased catalytic activity of the phosphorus-containing zeolite, the phosphorus-containing zeolite is contacted with water vapor prior to its use as a catalyst. Further, it is preferred that this contact with water vapor be carried out subsequent to contact with the phosphorus-containing compound but prior to heating. Contact of the phosphorus-containing zeolite with the water vapor may be carried out in any suitable manner. For example, sorption of water vapor on the phosphorus-containing zeolite can be effected in a vacuum disiccator at ambient conditions for one hour. Water vapor can also be sorbed by passing an inert gas such as helium through a water bubbler and passing the entrained water vapor through the phosphorus-containing zeolite in a reaction tube.

EXAMPLE 1

This example will illustrate the alkylation reaction of the process of the invention employing ethylene as the olefin to be alkylated and dimethyl ether as the alkylating agent.

The catalyst employed in this example was prepared by the following described procedure. Several preparations of crystalline aluminosilicates were combined to form a composite. Each of these aluminosilicates was ZSM-5 containing sodium as the cation associated therewith and had been prepared employing tetrapropylammonium hydroxide. The composite had a silica to alumina ratio of 70 and the individual zeolite catalysts had components falling in the ranges: 1.1–1.4% Na, 4.22–7.31% C, 0.39–0.63% N, 2.25–2.45% $Al_2O_3$, and 91.3–95.0% $SiO_2$. The C/N atomic ratio was 12.5–13.5 and the Na/Al ratio was approximately 1.2.

The composite, in powder form, was brought to a temperature of 540° C under a stream of nitrogen (the heating rate was about 2.5° C per minute) and held for 16 hours to remove residue of the tetrapropylammonium hydroxide. It was then pressed into wafers, crushed, and screened to 8–12 mesh, followed by ion exchange with 0.5 N $NH_4NO_3$, the $NH_4^+$ replacing the $Na^+$. The resulting pellets were air-dried and calcined in air at 500° C for 3–16 hours whereby $H^+$ replaced the $NH_4^+$ to form the zeolite catalyst.

A ten-gram sample of the zeolite was added to 3.94 cubic centimeters of trimethylphosphite dissolved in 50 cubic centimeters of n-octane in a flask. Under a slow stream of nitrogen the mixture was heated to reflux temperature (about 120° C) for 72 hours. A ten-inch vigreaux column was added to the flask for distillation and 21 grams of liquid were collected at 90°–113° C for subsequent analysis. The solids were filtered and washed with 100 cubic centimeters each of pentane, methylene chloride, and pentane. They were then air-dried followed by drying in a vacuum oven overnight at 110° C. They were next pressed into wafers, broken and screened to 8–12 mesh size and heated in nitrogen for 30 minutes at the temperature of reaction before use. The resulting phosphorus-containing zeolite catalyst contained about 3.5 percent by weight of phosphorus.

An approximately equimolar mixture of ethylene and dimethyl ether was passed over a fixed bed of the catalyst at a temperature of 300° C. The products were collected and analyzed. For comparison purposes, ethylene alone and dimethyl ether alone were similarly passed over a fixed bed of the catalyst and the products collected and analyzed.

Table I, as well as the tables set forth in Examples 2–8 following, identifies the respective reactants, identifies reaction products, gives the selectivities of the reaction products in terms of weight percent, gives the weight per hour space velocity of the respective reactants, the degree of conversion in weight percent of the respective reactants, and the material balance.

It will be observed from Table I that, in the alkylation reaction, the selectivity to propylene, which is the desired alkylation reaction product, was 85%. On the other hand, the selectivity to propylene was zero with ethylene alone and only 50% with dimethyl ether alone. Concerning the negative degree of conversion of ethylene in the alkylation reaction, this was the result of more ethylene being produced from the dimethyl ether than was consumed by alkylation to produce propylene and other products.

TABLE I

| Run No. | 1 | 2 | 3 |
|---|---|---|---|
| Temp, °C | 300 | 300 | 300 |
| Feed | $C_2H_4$ | — | $C_2H_4$ |
|  | — | MeOMe | MeOMe |
| WHSV $C_2H_4$ | 1.4 | — | 1.4 |
| MeOMe | — | 2.4 | 2.8 |
|  |  |  | 4.2 |
| Conversion, Wt.% |  |  |  |
| $C_2H_4$ | 0 | — | −5.8 |
| MeOMe | — | 0.22 | 23.4 |
| Material Balance, Wt. % | 99 | 98.6 | 98.1 |
| Selectivity to Products, Wt. % |  |  |  |
| $C_2H_4$ | Feed | 40.9 | Feed |
| $C_3H_6$ | 0 | 50.0 | 85.2 |
| $C_1$–$C_3$, All Other | 0 | 0 | 1.1 |
| $C_4H_8$ | 0 | 9.1 | 9.3 |
| $C_4$, All Other | 0 | 0 | 1.5 |
| $C_5$* | 0 | 0 | 2.9 |
| $C_6$* | 0 | 0 | 0 |
| $C_7{}^+$ | 0 | 0 | 0 |

*A mixture of olefins and paraffins; predominantly unsaturated compounds

EXAMPLE 2

This example will illustrate the alkylation of propylene with dimethyl ether by the process of the invention.

An approximately equimolar mixture of propylene and dimethyl ether was passed over a fixed bed of the same kind of catalyst as employed in Example 1. Various temperatures and weight per hour space velocities were employed. The products were collected and analyzed. For comparison purposes, at each of the temperatures employed, propylene alone and dimethyl ether alone were similarly passed over a fixed bed of the catalyst and the products collected and analyzed. At the temperature of 300° C, two comparison runs were made but the second comparison run was made at a higher weight per hour space velocity than the first. The reaction conditions and the results are given in Tables II, III, and IV.

It will be observed from the tables that decrease in the selectivity to butenes (n-$C_4H_8$), the desired alkylation product, occurred when going from temperatures of 300° C to 350° C (compare Tables II and III). In the runs shown in Table IV, it can be seen that the selectivity to butenes was highest at 300° C but was significantly lower at 350° C and 400° C. At the higher temperatures, apparently, side reactions or other reaction paths became more prominent. It will also be noted from the tables that the degree of conversion of the dimethyl ether increased with temperature.

The negative degree of conversion of propylene in Run 3 was the result of more propylene being produced from the dimethyl ether than was consumed by alkylation to produce butenes and other products.

TABLE II

| Run No. | 1 | 2 | 3 |
|---|---|---|---|
| Temp., °C | 300 | 300 | 300 |
| Feed | $C_3H_6$ | — | $C_3H_6$ |
|  | — | MeOMe | MeOMe |
| WHSV | 1.7 | 2.4 | 4.5 |
| Conversion, Wt.% |  |  |  |
| $C_3H_6$ | 7.3 | — | −8.2 |
| MeOMe | — | 0.22 | 13.1 |
| Material Balance, Wt. % | 97 | 98.6 | 103 |
| Selectivity to Products, Wt. % |  |  |  |
| $C_2H_4$ | 1.0 | 40.9 | .9 |
| $C_3H_6$ | Feed | 50.0 | Feed |
| $C_1$–$C_3$, All Other | 1.0 | 0 | 1.9 |
| n–$C_4H_8$ | 12.8 | 9.1 | 82.1 |
| $C_4$, All Other | .6 | 0 | 0 |
| $C_5$* | 13.8 | 0 | 15.2 |
| $C_6$* | 39.5 | 0 | 0 |
| $C_7{}^+$* | 33.3 | 0 | 0 |

*A mixture of olefins and paraffins; predominantly unsaturated compounds

TABLE III

| Run No. | 4 | 5 | 6 |
|---|---|---|---|
| Temp., °C | 400 | 400 | 400 |
| Feed | $C_3H_6$ | — | $C_3H_6$ |
|  | — | MeOMe | MeOMe |
| WHSV | 1.9 | 2.4 | 4.5 |
| Conversion, Wt.% |  |  |  |
| $C_3H_6$ | 15.8 | — | 44.2 |
| MeOMe | — | 56.7 | 99.5 |
| Material Balance, Wt.% | 100 | 101.7 | 99.2 |
| Selectivity to Products, Wt.% |  |  |  |
| $C_2H_4$ | .7 | 4.4 | .5 |
| $C_3H_6$ | Feed | 27.1 | Feed |
| $C_1$–$C_3$, All Other | .4 | 1.5 | 1.9 |
| n–$C_4H_8$ | 8.8 | 11.4 | 22.4 |
| $C_4$, All Other | 0 | 3.5 | 3.0 |
| $C_5$* | 22.8 | 13.2 | 27.6 |
| $C_6$* | 58.1 | 23.2 | 30.3 |
| $C_7{}^+$* | 9.2 | 15.7 | 14.3 |

*A mixture of olefins and paraffins; predominantly unsaturated compounds

TABLE IV

| Run No. | 7 | 8 | 9 | 10 | 11 | 12 | 13 | 14 | 15 | 16 |
|---|---|---|---|---|---|---|---|---|---|---|
| Temp., °C | 300 | 300 | 300 | 350 | 350 | 350 | 350 | 400 | 400 | 400 |
| Feed | $C_3H_6$ | — | $C_3H_6$+ | $C_3H_6$ | — | $C_3H_6$+ | $C_3H_6$+ | $C_3H_6$ | — | $C_3H_6$+ |
|  | — | MeOMe | MeOMe | — | MeOMe | MeOMe | MeOMe | — | MeOMe | MeOMe |
| WHSV | 13.5 | 14.5 | 13.6 | 13.5 | 14.5 | 13.6 | 13.7 | 13.5 | 14.5 | 13.6 |
| Conversion, Wt.% |  |  |  |  |  |  |  |  |  |  |
| $C_3H_6$ | 29.2 | — | 9.5 | 45.3 | — | 22.1 | 28.7 | 54.8 | — | 35.4 |
| MeOMe | — | 2.0 | 16.1 | — | 3.8 | 27.8 | 40.2 | — | 11.4 | 58.1 |
| Material Balance, Wt.% | 102.3 | 102.0 | 98.1 | 102.7 | 103.6 | 99.6 | 98.5 | 102.7 | 99.7 | 99.8 |
| Selectivity to Products, Wt.% |  |  |  |  |  |  |  |  |  |  |
| $C_2H_4$ | .1 | 1.1 | .3 | 0 | 2.1 | .5 | 1.2 | .1 | 2.7 | .4 |
| $C_3H_6$ | Feed | 38.7 | Feed | Feed | 32.2 | Feed | Feed | Feed | 22.6 | Feed |
| $C_1$–$C_3$, All Other | 0 | .1 | 0 | 0 | .2 | .2 | .8 | 0 | 1.8 | .5 |
| n—$C_4H_8$ | 25.4 | 10.0 | 60.0 | 30.2 | 9.1 | 33.4 | 34.6 | 37.9 | 16.7 | 40.4 |
| $C_4$, All Other | 0 | 0 | .1 | 0 | 0 | .1 | .7 | .1 | 0 | 2.1 |
| $C_5$* | 38.2 | 50.1 | 16.2 | 37.8 | 56.3 | 35.8 | 26.7 | 29.2 | 42.9 | 26.7 |
| $C_6$* | 14.8 | 0 | 5.7 | 13.9 | 0 | 10.6 | 11.9 | 17.2 | 1.8 | 14.2 |
| $C_7$+* | 21.5 | 0 | 17.7 | 18.1 | 0 | 19.4 | 24.1 | 15.5 | 11.5 | 15.6 |

*A mixture of olefins and paraffins; predominantly unsaturated compounds

EXAMPLE 3

This example will illustrate the alkylation of propylene with dimethyl ether by the process of the invention employing a catalyst having a lower phosphorus content.

The catalyst employed was of the same type and prepared in a manner similar to the catalyst employed in Example 1 except that its phosphorus content was 1.45% by weight. An approximately equimolar mixture of propylene and dimethyl ether was passed over a fixed bed of the catalyst at a temperature of 250° C. The products were collected and analyzed. For comparison purposes, propylene alone and dimethyl either alone were similarly passed over a fixed bed of the catalyst and the products collected and analyzed. The results are given in Table V.

The negative degree of conversion in Run 3 was for the same reason as in Run 3 in the previous example.

TABLE V

| Run No. | 1 | 2 | 3 |
|---|---|---|---|
| Feed/WHSV |  |  |  |
| MeOMe | — | 2.3 | 2.3 |
| $C_3H_6$ | 2.3 | — | 2.3 |
|  | 2.3 | 2.3 | 4.6 |
| Conversion, Wt.% |  |  |  |
| MeOMe | — | 8.8 | 8.7 |
| $C_3H_6$ | 22.5 | — | −6.0 |
| Material Balance, Wt.% | 102.1 | 99.1 | 101.5 |
| Selectivity to Products, Wt.% |  |  |  |
| $C_2H_4$ | 0 | 8.6 | 3.2 |
| $C_1$–$C_3$, All Other | 3.8 | 2.4 | 36.9 |
| $C_3H_6$ | Feed | 20.7 | Feed |
| $C_4H_{10}$ | 0 | 3.1 | 0 |
| $C_4H_8$ | 8.2 | 14.9 | 26.3 |
| $C_5$* | 13.5 | 5.6 | 27.0 |
| $C_6$* | 28.8 | 5.0 | 3.2 |
| $C_7$+* | 45.8 | 39.7 | 3.5 |

*A mixture of olefins and paraffins; predominantly unsaturated compounds

EXAMPLE 4

This example will further illustrate the alkylation of propylene with dimethyl ether by the process of the invention.

In this example, an approximately equimolar mixture of propylene and dimethyl ether was passed over a fixed bed of the same kind of catalyst employed in Example 1 at various temperatures and space velocities. The catalyst, however, prior to use, was heated in air at 500° C for one hour and contained 3.77 weight percent of phosphorus. The products were collected and analyzed. Tables VI, VII, and VIII give the reaction conditions and the results.

It will be observed from the tables that the selectivity to the desired alkylation product, i.e., the $C_4$ olefin, was significantly increased with increases in the weight per hour space velocity but was not greatly affected by temperature. However, the degree of conversion of reactants increased with temperature.

TABLE VI

| Run No. | 1 | 2 | 3 | 4 | 5 | 6 | 7 |
|---|---|---|---|---|---|---|---|
| Temp., °C | 250 | 300 | 325 | 300 | 300 | 325 | 350 |
| Feed/WHSV- |  |  |  |  |  |  |  |
| MeOMe | 1.1 | 1.1 | 1.1 | 2.3 | 2.3 | 2.3 | 2.3 |
| $C_3H_6$ | 1.1 | 1.1 | 1.1 | 2.3 | 2.3 | 2.3 | 2.3 |
| Total WHSV | 2.2 | 2.2 | 2.2 | 4.6 | 4.6 | 4.6 | 4.6 |
| Conversion, Wt.% |  |  |  |  |  |  |  |
| MeOMe | 1.2 | 23.0 | 58.1 | 17.6 | 16.0 | 32.7 | 49.4 |
| $C_3H_6$ | 19.5 | 38.0 | 56.8 | 11.4 | 12.9 | 20.8 | 29.6 |
| Material Balance, Wt.% | 97.3 | 100.9 | 102.8 | 102.4 | 102.4 | 103.5 | 104.2 |
| Selectivity to Products, Wt.% |  |  |  |  |  |  |  |
| $C_2H_4$ | .7 | 1.5 | 1.8 | 1.1 | 1.0 | 6.1 | 2.2 |
| $C_3H_6$ | Feed | Feed | Feed | Feed | Feed | Feed | Feed |
| $C_1$–$C_3$, All Other | 11.3 | 2.6 | 2.0 | 3.8 | 3.9 | 4.9 | 2.9 |
| $C_4H_{10}$ | 0 | .6 | 6.9 | .9 | 0 | .4 | .9 |
| $C_4H_8$ | 30.6 | 25.3 | 21.7 | 38.0 | 27.4 | 27.0 | 29.2 |
| $C_5$* | 19.4 | 14.7 | 16.7 | 18.0 | 29.7 | 15.6 | 18.7 |
| $C_6$* | 15.5 | 24.2 | 24.0 | 22.5 | 17.4 | 28.0 | 28.9 |
| $C_{7-9}$* | 12.9 | 14.1 | 13.1 | 10.3 | 10.8 | 12.4 | 11.7 |
| $C_{10}$* | 8.1 | 14.3 | 11.5 | 3.5 | 8.1 | 3.1 | 3.4 |
| Aromatics | 1.5 | 2.8 | 2.2 | 1.9 | 1.7 | 2.5 | 2.1 |

TABLE VII

| Run No. | 8 | 9 | 10 | 11 | 12 | 13 |
|---|---|---|---|---|---|---|
| Temp., °C | 300 | 325 | 350 | 300 | 325 | 350 |
| Feed/WHSV  MeOMe | 4.7 | 4.7 | 4.7 | 6.8 | 6.8 | 6.8 |
| $C_3H_6$ | 4.6 | 4.6 | 4.6 | 6.9 | 6.9 | 6.9 |
| Total WHSV | 9.3 | 9.3 | 9.3 | 13.7 | 13.7 | 13.7 |
| Conversion, Wt.% | | | | | | |
| MeOMe | 11.6 | 19.4 | 26.8 | 7.4 | 15.3 | 28.2 |
| $C_3H_6$ | 9.7 | 21.0 | 26.0 | 7.2 | 15.3 | 27.1 |
| Material Balance, Wt.% | 100.4 | 101.9 | 101.1 | 100.2 | 99.8 | 101.7 |
| Selectivity to Products, Wt.% | | | | | | |
| $C_2H_4$ | .3 | .5 | 1.0 | .6 | .3 | 2.4 |
| $C_3H_6$ | Feed | Feed | Feed | Feed | Feed | Feed |
| $C_1$-$C_3$, All Other | 4.8 | 2.4 | 2.4 | 6.3 | 3.4 | 8.8 |
| $C_4H_{10}$ | 0 | 0 | .2 | 0 | 0 | .1 |
| $C_4H_8$ | 33.7 | 30.4 | 35.7 | 35.1 | 38.6 | 50.8 |
| $C_5^*$ | 33.4 | 29.3 | 30.2 | 36.7 | 33.1 | 18.9 |
| $C_6^*$ | 13.1 | 18.4 | 17.4 | 10.1 | 13.5 | 11.5 |
| $C_{7-9}^*$ | 7.6 | 9.9 | 7.4 | 6.3 | 7.2 | 4.7 |
| $C_{10}^*$ | 5.4 | 7.0 | 3.9 | 3.8 | 2.5 | 1.6 |
| Aromatics | 1.6 | 2.1 | 1.7 | 1.1 | 1.5 | 1.1 |

*A mixture of olefins and paraffins; predominantly unsaturated compounds

TABLE VIII

| Run No. | 14 | 15 | 16 | 17 | 18 | 19 |
|---|---|---|---|---|---|---|
| Temp., °C | 300 | 350 | 375 | 400 | 450 | 500 |
| Feed/WHSV  MeOMe | 6.8 | 6.8 | 6.8 | 6.8 | 6.8 | 6.8 |
| $C_3H_6$ | 6.8 | 6.8 | 6.8 | 6.8 | 6.8 | 6.8 |
| Total WHSV | 13.6 | 13.6 | 13.6 | 13.6 | 13.6 | 13.6 |
| Conversion, Wt.% | | | | | | |
| MeOMe | 16.1 | 27.3 | 45.9 | 58.1 | 79.5 | 92.4 |
| $C_3H_6$ | 9.5 | 22.1 | 30.9 | 35.4 | 43.8 | 40.5 |
| Material Balance, Wt.% | 98.1 | 99.6 | 99.3 | 99.8 | 101.0 | 100.4 |
| Selectivity to Products, Wt.% | | | | | | |
| $C_2H_4$ | .3 | .5 | .2 | .4 | .5 | 1.0 |
| $C_3H_6$ | Feed | Feed | Feed | Feed | Feed | Feed |
| $C_1$-$C_3$, All Other | 0 | .2 | .1 | .5 | .4 | .6 |
| $C_4$ | .1 | .1 | .7 | 2.1 | .8 | .9 |
| $C_4H_8$ | 61.0 | 33.4 | 51.4 | 40.4 | 37.4 | 39.4 |
| $C_5^*$ | 15.2 | 35.8 | 21.3 | 26.7 | 33.8 | 30.3 |
| $C_6^*$ | 5.7 | 10.6 | 10.6 | 14.2 | 16.0 | 19.6 |
| $C_{7-9}^*$ | 13.1 | 17.3 | 13.7 | 14.4 | 10.2 | 8.1 |
| $C_{10}^*$ | 4.6 | 2.1 | 1.9 | 1.2 | .9 | .2 |

*A mixture of olefins and paraffins; predominantly unsaturated compounds

EXAMPLE 5

This example will illustrate the alkylation of butene-2 with dimethyl ether by the process of the invention.

An approximately equimolar mixture of butene-2 and dimethyl ether was passed over a fixed bed of the same kind of catalyst employed in Example 4 at various temperatures. The products were collected and analyzed. For comparison purposes, at each temperature, an equimolar mixture of butene-2 and nitrogen and an equimolar mixture of dimethyl ether and nitrogen were similarly passed over a fixed bed of the catalyst and the products similarly collected and analyzed. Dilution with nitrogen of the two individual components, olefin and ether, was intended to permit a comparison of the results with that of the mixture of olefin and ether at similar space velocities and other conditions within the catalyst bed. The reaction conditions and results are set forth in Table IX.

It will be noted from the table that the selectivity to the $C_5$ olefin, the desired alkylation reaction product, increased when the temperature was increased from 275° C to 300° C but decreased when the temperature was increased to 325° C.

TABLE IX

| Run No. | 1 | 2 | 3 | 4 | 5 | 6 | 7 | 8 | 9 |
|---|---|---|---|---|---|---|---|---|---|
| Temp., °C | 275 | 275 | 275 | 300 | 300 | 300 | 325 | 325 | 325 |
| Feed | $C_4H_8$ ($N_2$) | ($N_2$) MeOMe | $C_4H_8$ MeOMe | $C_4H_8$ ($N_2$) | ($N_2$) MeOMe | $C_4H_8$ MeOMe | $C_4H_8$ ($N_2$) | ($N_2$) MeOMe | $C_4H_8$ MeOMe |
| WHSV | 4.3 | 3.9 | 5.2 | 4.3 | 4.0 | 5.7 | 4.3 | 4.0 | 5.3 |
| Conversion, Wt.% | | | | | | | | | |
| $C_4H_8$ | 24.7 | — | 8.9 | 46.0 | — | 7.8 | 52.8 | — | 15.2 |
| MeOMe | — | 1.3 | 3.6 | — | 1.5 | 22.9 | — | 1.6 | 39.2 |
| Material Balance, Wt. % | 101.8 | 89.2 | 103.3 | 103.2 | 93.0 | 110.6 | 101.6 | 91.6 | 103.8 |
| Selectivity to Products, Wt.% | | | | | | | | | |
| $C_2H_4$ | .7 | 27.1 | 1.5 | 1.9 | 26.7 | 1.1 | .3 | 19.6 | .8 |
| $C_3H_6$ | 7.8 | 1.7 | 4.9 | 13.1 | 5.5 | 4.8 | 18.4 | 12.6 | 10.7 |
| $C_1$-$C_3$, All Other | .1 | 62.6 | 0 | 0 | 54.1 | 0 | .1 | 51.3 | 2.0 |
| $C_4H_{10}$ | 1.4 | 7.2 | 3.4 | 1.1 | 9.1 | 2.0 | 1.4 | 8.3 | 2.3 |
| $C_4H_8$ | Feed | 1.3 | Feed | Feed | 4.5 | Feed | Feed | 8.1 | Feed |
| $C_5^*$ | 30.8 | 0 | 44.9 | 28.9 | 0 | 50.1 | 39.0 | 0 | 37.0 |
| $C_6^*$ | 11.1 | 0 | 6.0 | 15.8 | 0 | 7.7 | 15.5 | 0 | 11.9 |
| $C_7$-$C_9^*$ | 40.0 | 0 | 29.9 | 32.4 | 0 | 26.9 | 24.0 | 0 | 27.3 |
| $C_{10}^+$ | 8.1 | 0 | 9.4 | 6.7 | 0 | 7.3 | 1.3 | 0 | 8.0 |

*A mixture of olefins and paraffins; predominantly unsaturated compounds

EXAMPLE 6

This example will illustrate the alkylation of isobutene with dimethyl ether by the process of the invention.

An approximately equimolar mixture of isobutene and dimethyl ether was passed at 300° C over a fixed bed of the same kind of catalyst employed in Example 4 but having a different phosphorus content. The products were collected and analyzed. For purposes of comparison, isobutene alone was similarly passed over a fixed bed of the catalyst. Also for purposes of comparison, an approximately equimolar mixture of nitrogen and dimethyl ether was passed over a fixed bed of a similar kind of catalyst but having a different phosphorus content. In each case, the products were collected and analyzed. The results, as well as the phosphorus contents of the catalysts, are given in Table X.

EXAMPLE 7

In this example, the results obtained by the alkylation of isobutene employing dimethyl ether as the alkylating agent are compared with those employing methanol as the alkylating agent.

Approximately equimolar mixtures of isobutene and dimethyl ether and isobutene and methanol were passed at three different temperatures over the same kind of catalyst employed in Example 1. The products in each run were collected and analyzed. The results are given in Table XI.

It will be observed from the table that the selectivities to the $C_5$ olefins, the desired reaction products, were higher than dimethyl ether than with methanol.

TABLE X

| Run No. | | 1 | | 2 | | 3 |
|---|---|---|---|---|---|---|
| Wt. % P | | 3.72 | | 4.38 | | 3.72 |
| Temp, °C | | 300 | | 300 | | 300 |
| Feed/WHSV | i—$C_4H_8$ | 3.1 | $N_2$ | 1.6 | i—$C_4H_8$ | 3.1 |
| | | | MeOMe | 2.4 | MeOMe | 2.2 |
| | | 3.1 | | 4.0 | | 5.3 |
| Conversion, Wt.% | | | | | | |
| i—$C_4H_8$ | | 61.6 | | — | | 38.7 |
| MeOMe | | — | | 1.5 | | 5.1 |
| Material Balance, Wt. % | | 96.0 | | 93 | | 102.1 |
| Selectivity to Products, Wt.% | | | | | | |
| $C_2H_4$ | | 0 | | 26.7 | | .7 |
| $C_3H_6$ | | 5.0 | | 5.5 | | 3.2 |
| $C_1$–$C_3$, All Other | | .3 | | 54.1 | | 0 |
| $C_4H_{10}$ | | 2.8 | | 9.1 | | 10.8 |
| $C_4H_8$ | | Feed | | 4.5 | | Feed |
| $C_4H_6$ | | 2.2 | | 0 | | .2 |
| $C_5$* | | 18.4 | | 0 | | 34.6 |
| $C_6$* | | 37.6 | | 0 | | 11.0 |
| $C_7^+$* | | 33.7 | | 0 | | 39.5 |

*A mixture of olefins and paraffins; predominantly unsaturated compounds

TABLE XI

| Run No. | | 1 | 2 | 3 | | 4 | 5 | 6 |
|---|---|---|---|---|---|---|---|---|
| Temp., °C | | 300 | 350 | 400 | | 300 | 350 | 400 |
| Feed/WHSV | i—$C_4H_8$ | 3.1 | 3.1 | 3.1 | i—$C_4H_8$ | 3.1 | 3.1 | 3.1 |
| MeOMe | | 2.2 | 2.2 | 2.2 | MeOH | 3.6 | 3.6 | 3.7 |
| Total WHSV | | 5.3 | 5.3 | 5.3 | | 6.7 | 6.7 | 6.8 |
| Conversion, Wt.% | | | | | | | | |
| i—$C_4H_8$ | | 38.7 | 58.4 | 72.4 | i—$C_4H_8$ | 23.3 | 48.2 | 69.0 |
| MeOMe | | 5.1 | 53.0 | 93.0 | MeOH | 54.5 | 81.6 | 88.7 |
| Material Balance, Wt. % | | 102.1 | 101.9 | 105.6 | | 100.2 | 100.3 | 98.8 |
| Selectivity to Products, Wt.% | | | | | | | | |
| $C_2H_4$ | | .7 | 2.0 | 1.6 | | 1.1 | 2.6 | 2.7 |
| $C_3H_6$ | | 3.2 | 6.9 | 9.2 | | 3.9 | 6.9 | 12.5 |
| $C_1$–$C_3$, All Other | | 0 | .1 | .6 | | 0 | 1.2 | .5 |
| $C_4H_{10}$ | | 10.8 | 11.1 | 8.5 | | 28.8 | 17.7 | 14.0 |
| $C_4H_6$ | | .2 | .6 | 1.5 | | 0 | .4 | 1.0 |
| $C_5$* | | 34.6 | 31.6 | 32.5 | | 13.9 | 25.7 | 26.1 |
| $C_6$* | | 11.0 | 22.8 | 27.2 | | 10.8 | 16.0 | 25.2 |
| $C_7^+$* | | 39.5 | 24.9 | 18.9 | | 41.4 | 29.6 | 18.0 |

*A mixture of olefins and paraffins; predominantly unsaturated compounds

EXAMPLE 8

This example will illustrate the alkylation of propylene with methyl chloride by the process of the invention.

An approximately equimolar mixture of propylene and methyl chloride was passed at two different temperatures over a fixed bed of catalyst, the catalyst having been prepared as described in Example 4 but containing a different amount of phosphorus. For purposes of comparison, at one temperature, an approximately equimolar mixture of nitrogen and propylene was passed over a bed of the same kind of catalyst employed for the mixture of propylene and methyl chloride. Also for purposes of comparison, at the other temperature, propylene alone was passed over a fixed bed of the catalyst, the catalyst having been prepared as described in Example 4 but containing a slightly greater amount of phosphorus. The products were collected and analyzed. Table XII gives the amounts of the phosphorus in the catalyst, the reaction conditions, and the results obtained in terms of product selectivity.

It will be observed from the table that, at 300° C, the methyl chloride was inert. However, it will also be observed that, at 350° C, the methyl chloride entered into the alkylation reaction and the selectivity to the $C_4$ olefins, the desired alkylation reaction product, was 45.1 percent.

contains 2 to 4 carbon atoms.

5. The process of claim 4 wherein said lower olefin is ethylene.
6. The process of claim 4 wherein said lower olefin is propylene.
7. The process of claim 4 wherein said lower olefin is a butene.
8. The process of claim 7 wherein said butene is butene-2.
9. The process of claim 7 wherein said butene is isobutene.
10. The process of claim 1 wherein said alkylating agent contains a methyl group.
11. The process of claim 10 wherein said alkylating agent is methanol.
12. The process of claim 10 wherein said alkylating agent is dimethyl ether.
13. The process of claim 10 wherein said alkylating agent is methyl chloride.
14. The process of claim 5 wherein said alkylating agent is dimethyl ether.
15. The process of claim 6 wherein said alkylating agent is dimethyl ether.
16. The process of claim 8 wherein said alkylating agent is dimethyl ether.
17. The process of claim 9 wherein said alkylating agent is dimethyl ether.
18. The process of claim 9 wherein said alkylating agent is methanol.
19. The process of claim 6 wherein said alkylating agent is methyl chloride.
20. The process of claim 1 wherein said olefin is contacted with said catalyst in the presence of said alkylating agent at a temperature of at least about 250° C.
21. The process of claim 20 wherein said temperature is about 250° C to 400° C.
22. The process of claim 21 wherein said temperature is at least about 300° C.
23. The process of claim 19 wherein said lower olefin is contacted with said catalyst in the presence of said methyl chloride at a temperature of at least about 350° C.
24. The process of claim 1 wherein said phosphorus is in an amount of about 0.78 to 4.5 percent by weight.

TABLE XII

| Run No. | 1 | 2 | 3 | 4 |
|---|---|---|---|---|
| Wt. % P | 4.38 | 4.38 | 4.38 | 3.77 |
| Temp., °C | 300 | 300 | 350 | 350 |
| Feed/WHSV | $CH_3Cl$/2.1 | $N_2$/1.6 | $CH_3Cl$/2.1 | $C_3H_6$/13.5 |
|  | $C_3H_6$/2.4 | $C_3H_6$/2.3 | $C_3H_6$/2.4 |  |
| Total WHSV | 4.5 | 3.9 | 4.5 | 13.5 |
| Conversion, Wt.% | $C_3H_6$/43.3 | $C_3H_6$/39.1 | $C_3H_6$/48.8 | $C_3H_6$/45.3 |
|  | $CH_3Cl$/0 |  | $CH_3Cl$/12.8 |  |
| Material Balance, Wt.% | 102.0 | 93.8 | 101.9 | 102.7 |
| Selectivity to Products, Wt.% |  |  |  |  |
| $C_2H_4$ | 0 | 4.3 | 0 | 0 |
| $C_3H_6$ | Feed | Feed | Feed | Feed |
| $C_1-C_3$, All Other | 1.4 | 2.3 | 1.5 | 0 |
| $C_4H_{10}$ | 0 | 0 | 0 | 0 |
| $C_4H_8$ | 25.4 | 22.5 | 45.1 | 30.2 |
| $C_5$* | 30.7 | 26.8 | 23.8 | 37.8 |
| $C_6$ | 13.6 | 15.1 | 11.3 | 13.9 |
| $C_{7-9}$* | 23.5 | 23.6 | 16.4 | 18.1 |
| $C_{10}$** | 5.4 | 5.4 | 1.9 | 0 |

*A mixture of olefins and paraffins; predominantly unsaturated compounds.

We claim:

1. A process for the alkylation of an olefin with an alkylating agent comprising contacting said olefin in the presence of said alkylating agent with a catalyst comprising a crystalline aluminosilicate zeolite having a silica to alumina ratio of at least about 12, a constraint index of about 1 to 12, and containing phosphorus incorporated with the crystal structure thereof in an amount of at least about 0.78 percent by weight.
2. The process of claim 1 wherein said zeolite has a dried crystal density of not less than about 1.6 grams per cubic centimeter.
3. The process of claim 1 wherein said olefin is a lower olefin.
4. The process of claim 3 wherein said lower olefin 25. The process of claim 24 wherein said phosphorus is in an amount of at least about 2.5 percent by weight.

26. The process of claim 1 wherein said olefin is contacted with said catalyst in the presence of said alkylating agent by passing said olefin in mixture with said alkylating agent over a fixed bed of said catalyst.

27. The process of claim 26 wherein said olefin and said alkylating agent are passed over said fixed bed of said catalyst at a weight per hour space velocity of at least about 0.5.

28. The process of claim 27 wherein said weight per hour space velocity is about 0.5 to 19.

29. The process of claim 1 wherein said olefin and said alkylating agent are in the vapor phase.

30. The process of claim 1 wherein said zeolite is ZSM-5.

31. The process of claim 1 wherein said zeolite is ZSM-11.

32. The process of claim 1 wherein said zeolite is ZSM-12.

33. The process of claim 1 wherein said zeolite is ZSM-21.

34. The process of claim 1 wherein said zeolite is TEA mordenite.

35. A process for the alkylation of an olefin seleced from the class consisting of ethylene, propylene, butene-2 and isobutene with an alkylating agent selected from the class consisting of methanol, dimethyl ether and methyl chloride comprising passing a mixture of said olefin and said alkylating agent at a weight per hour space velocity of about 1 to 19 at a temperature of about 250° C to 400° C over a fixed bed of a catalyst comprising a crystalline aluminosilicate zeolite having a silica to alumina ratio of at least about 12, a constraint index of about 1 to 12, a dried crystal density of not less than about 1.6 grams per cubic centimeter, and containing phosphorus incorporated with the crystal structure thereof in an amount of about 0.78 to 4.5 percent by weight.

* * * * *

UNITED STATES PATENT AND TRADEMARK OFFICE
CERTIFICATE OF CORRECTION

PATENT NO. : 3,906,054
DATED : September 16, 1975
INVENTOR(S) : Warren W. Kaeding and Stephen A. Butter It is certified that error appears in the above-identified patent and that said Letters Patent are hereby corrected as shown below:

| | |
|---|---|
| Col. 3, line 40 | After word "size", the word -- such -- is omitted. |
| Col. 11, Table I | "$C_7^+ =$" should be -- $C_7^{+*}$ -- (equal sign should be an asterisk) |
| Col. 11, Table I | In Run 3, "2.8" should be -- $\frac{2.8}{4.2}$ -- |
| Col. 13, Table V, line 44 | In Run No. 1, "2.3" should be - $\frac{2.3}{2.3}$ -- |
| Col. 13, Table V, line 44 | In Run No. 2, "$\frac{-}{2.3}$" should be -- $\frac{-}{2.3}$ -- |
| Col. 13, Table V, line 44 | In Run No. 3, "$\frac{2.3}{4.6}$" should be -- $\frac{2.3}{4.6}$ -- |
| Col. 18, line 17 | After "higher" word "than" should be -- with -- |
| Col. 22, line 5 | Word "seleced" -- should be -- selected-- |

Signed and Sealed this

Twelfth Day of April 1977

[SEAL]

Attest:

RUTH C. MASON
Attesting Officer

C. MARSHALL DANN
Commissioner of Patents and Trademarks